Jan. 16, 1940.  W. W. WOOD  2,187,258
CONTROLLER
Filed Aug. 31, 1936
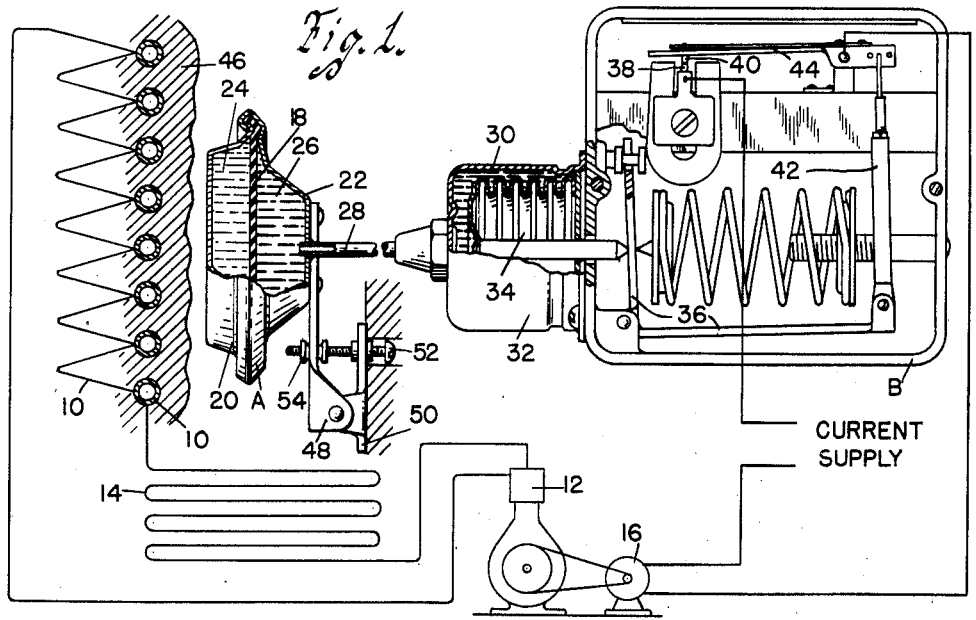
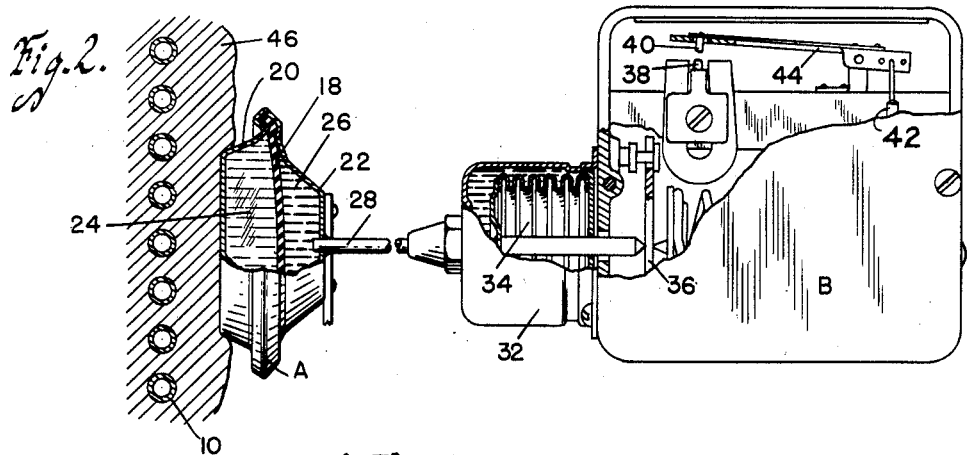
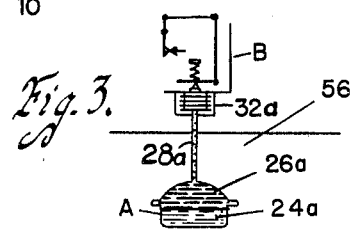
Witness
H. S. Umgenmair
Inventor
Wilbur W. Wood
by Bair, Freeman & Sinclair
Attorneys Patented Jan. 16, 1940

2,187,258

UNITED STATES PATENT OFFICE 2,187,258

CONTROLLER

Wilbur W. Wood, Des Moines, Iowa, assignor to Penn Electric Switch Co., Des Moines, Iowa, a corporation of Iowa Application August 31, 1936, Serial No. 98,671

1 Claim. (Cl. 62—2)

An object of my invention is to provide a controller of simple, durable and inexpensive construction which is responsive to the amount of ice built up on an evaporator coil or the like.

A further object is to provide an ice responsive controller in which water, or any liquid that freezes at the desired temperature, is contained in a chamber or compartment and means is provided (preferably in the form of a liquid which remains in the liquid phase throughout the cyclic operation of a refrigerating system or the like) for transmitting the movement of the water or freezable liquid upon the same freezing and thereby expanding to a switch or other control member.

A further object is to provide a controller which is responsive to the amount of ice built up on an evaporator coil or the like, and which may be positioned relative to the evaporator coil, the controller being operable from one control position to another upon contact with the ice formed on the evaporator and thereby responsive to the thickness of ice depending on the position of the controller relative to the evaporator coil.

With these and other objects in view, my invention consists in the construction, arrangement and combination of the various parts of my device, whereby the objects contemplated are attained, as hereinafter more fully set forth, pointed out in my claim, and illustrated in the accompanying drawing, in which:

Figure 1 is a side elevation partly in section of a controller embodying my invention and showing it diagrammatically associated with a refrigerating system including an evaporator coil having ice frozen thereon to a degree which does not operate the controller.

Figure 2 is a similar view of a portion of Figure 1 showing the ice formed to a greater thickness and operating the controller from one position to another; and Figure 3 is a diagrammatical view showing a modified form of the controller.

On the accompanying drawing I have used the reference numeral 10 to indicate the evaporator coil of a refrigerating system. The coil is shown partly in cross section and partly diagrammatical and is connected in the usual manner with the refrigerant compressor 12 and condenser coil 14.

My controller includes an ice responsive element A and a control device B, the device being shown in the form of a switch for controlling a motor 16. The motor is operatively connected with the compressor 12 for operating it cyclically and automatically in response to the control device B.

The ice responsive element A comprises a diaphragm chamber in which the diaphragm is indicated at 18 and the two halves of the chamber at 20 and 22 respectively. The diaphragm chamber on one side of the diaphragm 18 is charged with a freezable liquid such as water 24. The other side is charged with a liquid having a lower freezing point than the liquid 24, such as water and alcohol or oil, indicated at 26.

The portion 22 of the diaphragm chamber is connected by a tube 28 with an expansible chamber such as one of the bellows type indicated at 30 and formed by an outer casing 32 and a bellows 34. The liquid 26 completely fills the space on the right side of the diaphragm 18 in the diaphragm chamber, the tube 28 and the chamber 30. The bellows 34 upon being contracted, due to expansion of the ice 24 after it forms, swings a bell crank lever 36 in a clockwise direction for opening the contacts 38 and 40 of an electric control switch of the control device B. The lever 36 is connected by a link 42 with an armature 44 which carries the contact 40.

My controller is particularly adapted for controlling the formation of ice on an evaporator coil. For this purpose the liquid 24 may be water and the element A is located a predetermined distance from the evaporator coil 10, this distance being determined by the thickness of the ice 46 desired to be formed on the refrigerator coil before the control switch B de-energizes the motor 16.

As shown in Figure 1, the ice has not contacted the element A, whereas in Figure 2 it has contacted the element and formed slightly thicker after such contact, during which period of time the water 24 freezes and the expansion of the ice formed thereby changes the position of the diaphragm as shown in Figure 2. The liquid 26 then acts as a movement transmitting means for transmitting the movement of the diaphragm 18 to the bellows 34. The liquid 26, therefore, serves as a positive transmitting element without, however, being detrimentally affected by ambient temperature surrounding the element A, the tube 28 and the chamber 30.

The controller, however, is thus accurately responsive to the formation of ice and may be adjusted to vary the control point in response to different degrees of ice formation by being moved toward or away from the evaporator coil 10. This may be accomplished in any suitable manner. By way of illustration I show the element A mounted on a lever 48 pivoted to a bracket 50. An adjusting screw 52 is rotatably and nonslidably associated with the bracket 50 and screw-threadedly associated with a nut 54 carried by the lever 48.

In Figure 3 I show a modified construction in which the parts corresponding to the previously described elements have the same reference numeral with the addition of the character *a*. The element A in this case is located within a chamber 56 and is responsive to the temperature in the chamber. The liquid 24*a* may be any suitable liquid which expands upon freezing, and which freezes at the desired controlling ambient temperature instead of freezing in response to contact of ice with the element A.

If desired the diaphragm 18 can be omitted as illustrated in this figure, and the liquid 26*a* be of such nature that it has less specific gravity than the liquid 24*a* and will not mix with the liquid 24*a*. Transmission of movement of the freezing liquid 24*a* to the control device B is secured in the same manner, the liquid 26*a* acting as a transmission liquid.

From the foregoing description of my invention it is obvious that various liquids may be used, the main requisite being that the liquid 24 have a freezing point adjacent the temperature at which the controller is to be operated, and the liquid 26 have a lower freezing point so that it will remain in the liquid phase throughout the operation of the refrigerating system or other system to which the controller is applied.

The control device B may be a switch as illustrated or any other mechanical or electrical controller or may be merely a signal device if desired.

Some changes may be made in the construction and arrangement of the parts of my device without departing from the real spirit and purpose of my invention, and it is my intention to cover by my claim any modified forms of structure or use of mechanical equivalents which may be reasonably included within its scope.

I claim as my invention:

In a controller responsive to the formation of ice, a control member, means for actuating said control member comprising a variable volume chamber, means for supporting said variable volume chamber adjacent an evaporator, said means being adjustable to vary the distance of the variable volume chamber from the evaporator as desired, after which such distance remains fixed, a liquid in said variable volume chamber which freezes by ice forming on the evaporator to such thickness as to contact with the chamber, a second variable volume chamber associated with said first chamber, said second chamber being contracted by expansion of said first chamber, and a substance in said second chamber remaining in the liquid phase during the entire range of temperatures affecting said second chamber and thereby operable to transmit the movement caused by expansion due to freezing of said first liquid or contraction due to melting thereof to said control member.

WILBUR W. WOOD.